(12) United States Patent
Yokoya et al.

(10) Patent No.: US 6,652,264 B2
(45) Date of Patent: Nov. 25, 2003

(54) ELECTRIC INJECTION MECHANISM

(75) Inventors: Kinji Yokoya, Nagano-ken (JP); Hiroshi Yamaura, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 48 days.

(21) Appl. No.: 09/996,650

(22) Filed: Nov. 28, 2001

(65) Prior Publication Data

US 2002/0081351 A1 Jun. 27, 2002

(30) Foreign Application Priority Data

Nov. 29, 2000 (JP) ........................................ 2000-363310

(51) Int. Cl.[7] .............................................. B29C 45/64
(52) U.S. Cl. ............... 425/574; 425/575; 425/DIG. 129
(58) Field of Search ................................ 425/542, 574, 425/575, DIG. 129, 190

(56) References Cited

U.S. PATENT DOCUMENTS 3,600,755 A * 8/1971 Cook ........................ 425/574
3,822,975 A * 7/1974 Hehl ......................... 425/574
5,968,563 A * 10/1999 Hehl ......................... 425/574

* cited by examiner

Primary Examiner—Tim Heitbrink
(74) Attorney, Agent, or Firm—Weingarten, Schurgin, Gagnebin & Lebovici LLP

(57) ABSTRACT

Centering of an injection heating cylinder and screw driver is provided even after assembly, using an electric injection mechanism with height adjustment for the screw driver. A front plate is provided with an injection heating cylinder having a screw installed inside at the front middle and a rear plate is provided with are electric motor for injection-driving. The plates are affixed to an installation member. The front and rear plates are linked by guide bars installed between them. The screw driver is inserted into the guide bar and movably disposed between the plates. A driving mechanism connected to an electric motor is composed of a ball screw shaft and a ball nut member, and is installed over the screw driver and the rear plate. A centering member slidably supports the screw driver 10 and, moreover, provides height adjustment, and is installed at the sides of the screw driver.

3 Claims, 3 Drawing Sheets

ELECTRIC INJECTION MECHANISM

BACKGROUND OF THE INVENTION

1. Field of the Invention

The present invention concerns an electric injection mechanism for driving a screw driver using an electric motor.

2. Detailed Description of the Prior Art

In existing systems, electric injection mechanisms having an electric motor such as a servomotor or the like as driving source, and injection-driving a screw by converting rotation movement by the electric motor into liner movement by a ball screw shaft and a ball nut member, have included examples adopting a single ball screw shaft and examples adopting a plurality of ball screw shafts.

In any of these existing types, a screw driver is inserted movably forward and backward into a guide bar between a pair of front and rear plates. The ball screw shaft (rotated by the electric motor) engages with the ball nut member installed in the screw driver. Further, in such existing systems, the rear end of a screw in an injection heading cylinder mounted at the front middle of a front plate is rotatably linked to the front middle of the screw driver.

In such configurations, if the injection heating cylinder and the screw driver are decentered even slightly in mounting, the injection heating cylinder and the screw therein are also decentered. This may provoke gnawing or breakage, and, moreover, the parallelism with respect to a guide bar supporting the screw driver is affected, increasing the sliding resistance against the movement of the screw driver. Such interactions may easily result in inconvenience of control or other troubles during operation.

The centers of the injection heating cylinder and screw driver are defined by the processing accuracy or the assembling accuracy of respective members making up the injection mechanism. It is extremely difficult to adjust misalignment after assembly is completed. However, as the misalignment often appears in the height direction as an effect of the load, and the misalignment during operation is caused by the inflection of the guide bar, due to the load of the screw driver, most of problems due to misalignment can be resolved, if the height of the screw driver can be adjusted by any means, even after assembly.

The present invention addresses the above problems, and has an object of providing a novel electric injection mechanism allowing adjustment of the height of the screw driver by an extremely simple means after assembly. The present invention allows the injection heating cylinder and the screw driver to be easily aligned, and prevents misalignment during operation.

SUMMARY OF THE INVENTION

According to the above described objects of the invention and others, the present invention includes a front plate provided with an injection heating cylinder having a screw inside at the front middle, a rear plate provided with an electric motor for injection-driving, an installation member affixing both plates, a plurality of guide bars installed between the plates, linking the pair of front and rear plates. The present invention further includes a screw driver moveable forward and backward between the plates by insertion into the guide bars, and a driving means including a ball screw shaft and ball nut member disposed over the screw driver and the rear plate by connection with the electric motor. A member for centering the injection heating cylinder and screw driver, slidably supporting the screw driver, and interposed between the installation member and the screw driver, and having a height adjustment mechanism, is installed at both sides of the lower portion of the screw driver.

In addition, the driving means includes a pair of ball screw shafts rotatably juxtaposed over the front plate and rear plate, and a pair of ball nut members at both sides of the screw driver, installed in the screw driver and engaging respectively with the ball screw shafts.

Further, the centering member includes a pair of overlapping wedge-shaped members, forming a contact surfaces respectively with their slanted surfaces, both linked relatively movably by an adjustment screw, with one affixed to the bottom face of the screw driver, while the other is put on the top face of the installation member.

DETAILED DESCRIPTION OF THE PREFERRED EMBODIMENT

Figure 1:
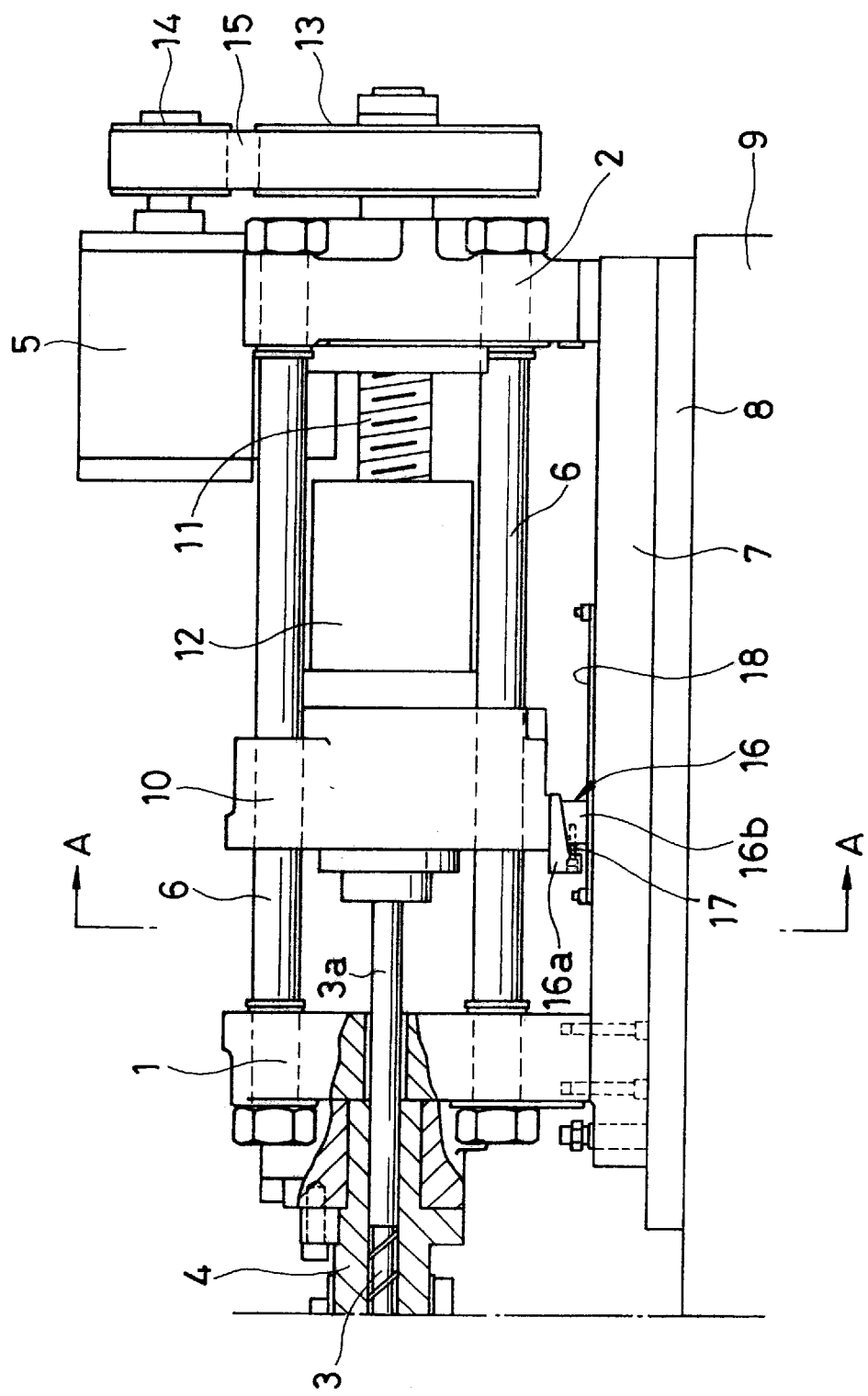
FIG. 1 is a side view showing a part of the electric injection mechanism of the present invention.

Now with references to the drawings, 1 indicates a front plate and 2 a rear plate. The front plate 1 is provided with an injection heating cylinder 4 having a screw 3 for injection installed inside, rotatable and movable forward and backward, at the front middle. The rear plate 2 is provided with an electric motor 5, for injection-driving by a servomotor or the like.

The pair of front and rear plates 1 and 2 are linked to four corners by guide bars 6. At the same time, both sides of the lower portions of the plates 1 and 2 are respectively fixed onto both ends of a pair of right and left installation members 7, for affixing onto the top face of a foundation 9 of a machine base 8.

Reference number 10 indicates a screw driver, disposed movably forward and backward between the pair of front and rear plates 1 and 2. The rear end of the screw 3 is rotatably linked to the front middle of the screw driver 10. Also, a ball nut member 12 is engaged with a ball screw shaft 11 born rotatably by the rear plate 2, and is mounted integrally to the rear middle of the screw driver 10.

Though not shown in the drawing, an electric motor and screw rotation mechanism of weighing the material, providing weighing of the material by screw rotation in the conventional method of the injection molding art, is, for example, mounted on the screw driver 10.

A pulley 13 is attached to the outer end of the rear plate 2 of the ball screw shaft 11, and a timing belt 15 is wound around the pulley 13 and a pulley 14 of the electric motor 5. The ball screw shaft 11 may accordingly be rotated by the electric motor 5, and the rotational movement is converted into a linear movement by the ball nut member 12. The screw driver 10 accordingly drives forward with the screw, and resin weighed in the front section of the injection heating cylinder 4 is injected.

Reference number 16 indicates a centering member of the injection heating cylinder 4 and screw driver 10, including a pair of overlapping wedge-shaped members 16a and 16b, forming contact surfaces respectively by their slanted surfaces, both linked movably by an adjustment screw 17 on the side.

As shown in FIG. 1, one of the centering members 16 is affixed as upper member 16a to the bottom face, just under the guide bar, of the screw driver 10. The other one of the centering members 16 is put as sliding lower member 16b on the top face of the installation member 7, between both sides of the lower section of the screw driver 10 and installation member 7. The height of the screw driver 10 is changed together with a tie bar 6, by changing the degree of mutual overlapping of the members 16a and 16b by rotating the adjustment screw 17, whereby the injection heating cylinder 4 and screw driver 10 can be aligned.

During attachment of the centering member 16, it is preferable to put a sliding plate 18 on the top face of the installation member 7, set the lower member 16b thereon, so that the forward and backward movement of the screw driver 10 is smooth, and the height adjusted position controlled by the centering member 16 is maintained during operation, even while both sides of its lower section are in a state being always supported by the installation member 7.

Figure 2:
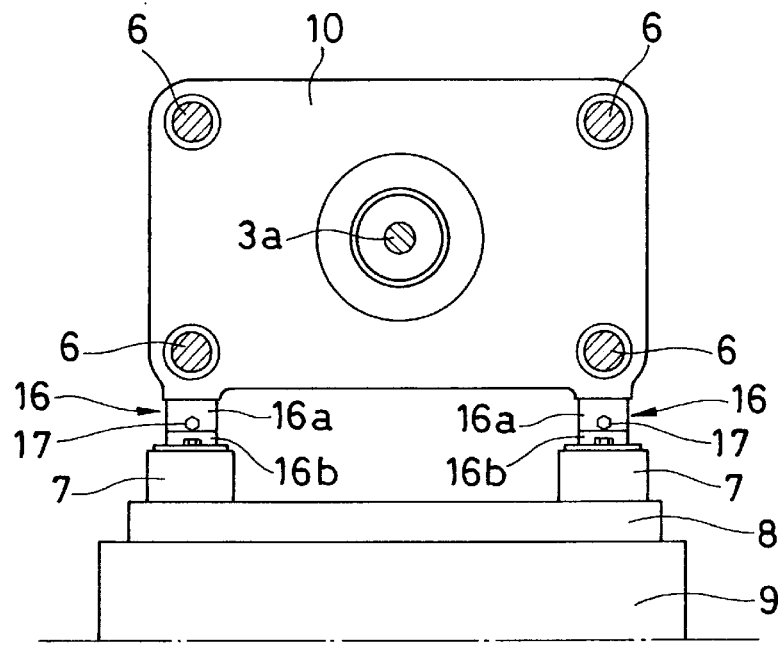
FIG. 2 is a section view along the line A—A of FIG. 1.
Figure 3:
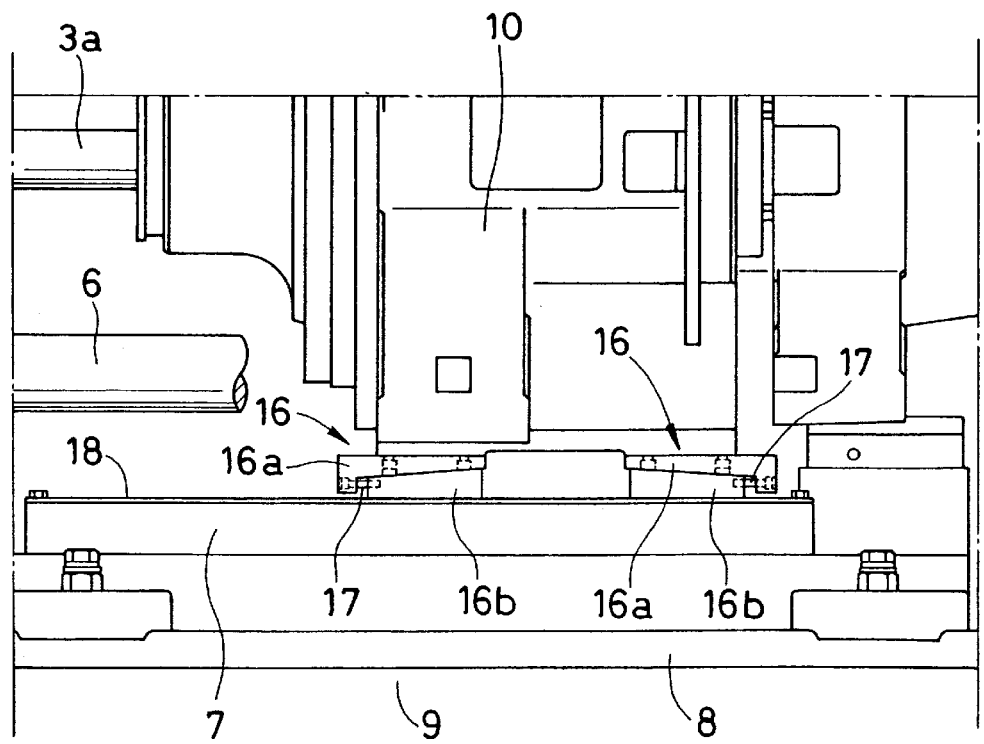
FIG. 3 is a side view of essential parts of another embodiment of the disclosed electric injection mechanism.

With regard to the attachment point of the centering member 16, though it is attached to two points at the front lower side of the screw driver 10, as show in the embodiment of FIGS. 1 and 2, it may also be preferably attached to the rear section for performing the height adjustment and support of the screw driver 10 at four front and rear points, as shown in FIG. 3, to accommodate a relatively larger sized screw driver 10.

In the aforementioned embodiment, as the height of the screw driver 10 can be adjusted together with the tie bar 6 even after assembly, by attaching the centering member 16, the centering of the injection heating cylinder 4 and the screw driver 10 can be performed easily only by adjusting the height of the screw driver 10 through the individual operation of right and left, or front and rear right and left centering members 16, even in a case where such centering is required, due to the processing accuracy or assembly state of the injection mechanism.

Moreover, in the embodiment adopting wedge-shaped upper and lower members 16a, 16b for the centering member 16, the resulting structure is extremely simple, and the attachment can be completed simply. Even a delicate misalignment can be rectified, as the height adjustment can be performed by changing the degree of overlapping of the mutual slant faces through the adjustment screw rotation.

Still further, as both sides of the screw driver 10 may be grounded to the machine base side by the centering member 16, the screw driver side load is shared by both the guide bar 6 and the centering member 16 This allows prevention of misalignment caused by the flexion due to the load of the guide bar 6.

Figure 4:
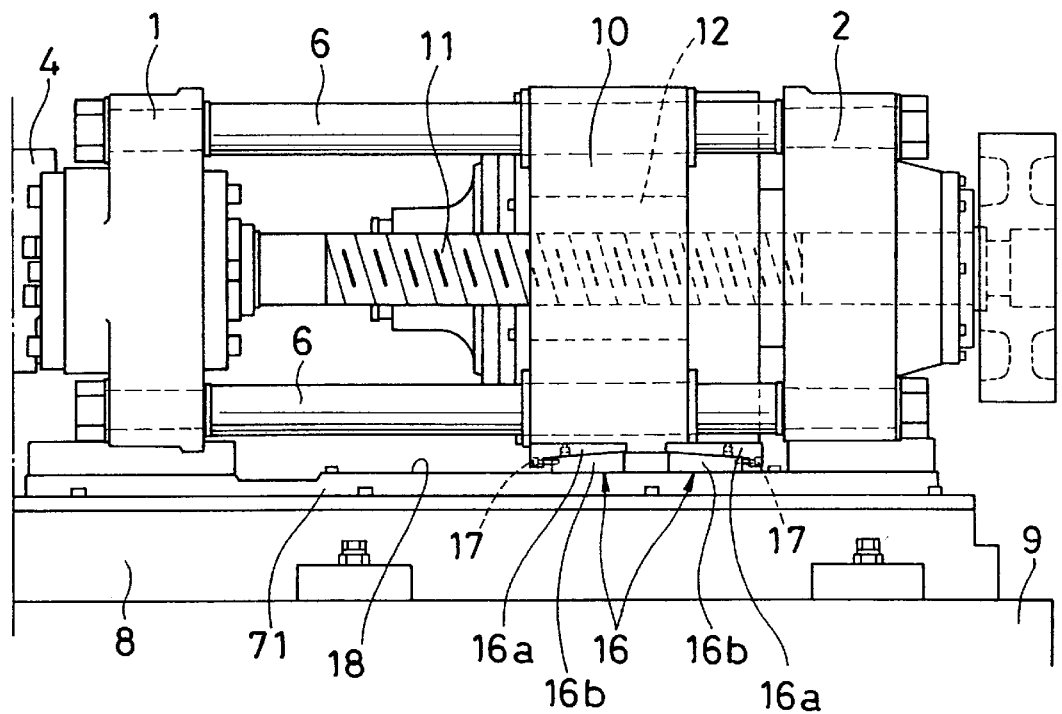
FIG. 4 is a side view of the electric injection mechanism of the present invention provided with a driving means by a pair of ball screw shaft, and wherein the electric motor is not shown.
Figure 5:
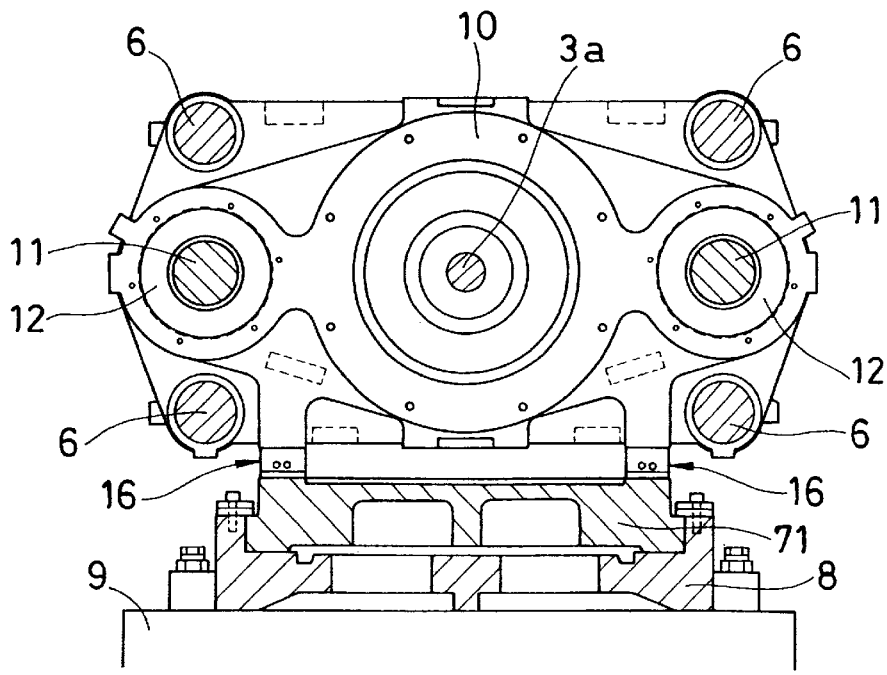
FIG. 5 is a cross-section view of the embodiment shown in FIG. 4.

FIGS. 4 and FIG. 5 show embodiments of the electric injection mechanism provided with twin shaft type driving means. It should be appreciated that parts already shown in the embodiment shown in FIGS. 1 to 3 are indicated by the same reference symbols in FIGS. 4 and 5.

In the embodiment of FIGS. 4 and 5, a pair of front and rear plates 1, 2 are affixed to the machine base B by linking with guide bars 6, 6 at four corners. The fixation of plates 1 and 2 is, for example, realized by resting and affixing the lower sides of the front and rear plates 1 and 2 on a disk-shape installation member 71 put on the top face of a foundation 9.

In addition, at the middle of two opposing sides of the front and rear plates 1,2, a pair of ball screw shafts 11 are installed. The ball screw shafts 11 are rotatably supported in parallel with the guide bars 6. The rear end of the ball screw shaft 6 is connected to an electric motor for injection-driving (not shown).

A screw driver 10 is show supported movably forward and backward by inserting into the guide bar 6., In the middle of right and left sides of the screw driver 10, a pair of ball nut members 12 are shown movable with the screw driver 10 on the ball screw shaft 11, engaging with the ball screw shaft 11 installed within.

A centering member 16 of the screw driver 10 is installed between the front and rear sides of the lower portion of the screw driver 10, wherein the guide bars 6 of the screw driver 10 are inserted and adjacent to the installation member 71. The centering member 16 includes a pair of wedge-shaped members overlapping and forming a contact surface by their respective slanted surfaces. The wedge shaped members of the centering member are moveably linked by an adjustment screw 17 on the side.

One of the centering members 16 is affixed as upper member 16a to a bottom face of the screwdriver 10 and not opposite the guide bar of the screw driver 10. The other one of the centering members 16 is shown as lower member 16, where lower member 16b is rested on a top face of the screwdriver 16 at both sides of the installation member 71. The height of the screw driver 10 is changed together with the tie bar 6, by changing the degree of their mutual overlapping by rotating the adjustment screw 17, whereby the injection heating cylinder 4 and screw driver 10 can be aligned.

In addition, during attachment of the centering member 16, a sliding plate 18 is put on a top face at both sides of the installation member 71, and the lower member 16b is rested thereon, so that a smooth sliding generates, even when both sides of the lower section of the screw driver 10 is in a state being always supported by the installation member 71.

As mentioned above, in the electric injection mechanism provided with a twin type driving means, the height of the screw driver 10 after the assembly can be adjusted together with the tie bar 6, by attaching the centering member 16. Accordingly, centering can be performed easily, even in a case where such centering is required, as a result of the processing accuracy or assembly state of the injection mechanism, and the screw driver side load can be shared through the centering member 16, allowing prevention of the misalignment caused by flexion due to the load of the guide bar 6.

What is claimed is:

1. An electric injection mechanism, comprising:
    a front plate provided with an injection heating cylinder, a screw inside said heating cylinder, a rear plate provided with an electric motor for injection-driving, an installation member affixing both plates, a plurality of guide bars installed between said plates and linking said pair of front and rear plates, a screw driver disposed movably forward and backward between the plates by inserting onto the guide bars, and a driving means comprised of ball screw shaft and ball nut member disposed over the screw driver and the rear plate by connecting with said electric motor, wherein:

a centering member for centering said injection heating cylinder and screw driver, having a height adjustment means and slidably supporting the screw driver, said centering member being interposed between said installation member and said screw driver at both sides of the lower portion of said screw driver.

2. The electric injection mechanism of claim 1, wherein:

said driving means is comprised of a pair of ball screw shafts rotatably juxtaposed over said front plate and rear plate, and a pair of said ball nut members at both sides of the screw driver, installed in said screw driver and engaging respectively with the ball screw shafts.

3. The electric injection mechanism of claim 1, wherein:

said centering member is comprised of a pair of wedge-shape members overlapping alternately by forming a contact surface respectively as the slant surface, said wedge-shaped members are linked relatively movably by an adjustment screw, one of said wedge-shape members being affixed to a bottom face of said screw driver, while the other of said wedge-shape members is put on a top face of said installation member.

* * * * *

UNITED STATES PATENT AND TRADEMARK OFFICE
CERTIFICATE OF CORRECTION

PATENT NO. : 6,652,264 B2
DATED : November 25, 2003
INVENTOR(S) : Kinji Yokoya et al.

It is certified that error appears in the above-identified patent and that said Letters Patent is hereby corrected as shown below:

Title page,
Item [57], ABSTRACT,
Line 6, "are" should read -- an --;

Column 3,
Line 66, "base B" should read -- base 8 --; and

Column 4,
Line 12, "show" should read -- shown --.

Signed and Sealed this

Tenth Day of August, 2004

JON W. DUDAS
*Acting Director of the United States Patent and Trademark Office*